United States Patent
Dissett et al.

(10) Patent No.: US 7,874,954 B2
(45) Date of Patent: Jan. 25, 2011

(54) LOCKING DIFFERENTIAL INCLUDING RESILIENT DISC MEANS

(75) Inventors: Walter L. Dissett, Farmington Hills, MI (US); Steven J. Cochren, Commerce Township, MI (US)

(73) Assignee: Eaton Corporation, Cleveland, OH (US)

( * ) Notice: Subject to any disclaimer, the term of this patent is extended or adjusted under 35 U.S.C. 154(b) by 639 days.

(21) Appl. No.: 11/705,901

(22) Filed: Feb. 14, 2007

(65) Prior Publication Data

US 2008/0190240 A1    Aug. 14, 2008

(51) Int. Cl.
*F16H 48/20* (2006.01)
(52) U.S. Cl. .................. 475/223; 475/231; 475/249
(58) Field of Classification Search .......... 475/223, 475/231, 249; 192/107 R, 107 M; 267/162
See application file for complete search history.

(56) References Cited

U.S. PATENT DOCUMENTS

| 4,498,355 | A | | 2/1985 | Schou | |
| 4,640,143 | A | * | 2/1987 | Schou | 74/650 |
| 4,845,831 | A | * | 7/1989 | Schou | 29/434 |
| 5,413,015 | A | | 5/1995 | Zentmyer | |
| 5,715,733 | A | | 2/1998 | Dissett | |
| 5,727,430 | A | | 3/1998 | Valente | |
| 5,836,220 | A | | 11/1998 | Valente | |
| 6,688,194 | B2 | | 2/2004 | Dissett | |
| 2003/0147723 | A1 | * | 8/2003 | Schwab | 411/526 |

* cited by examiner

*Primary Examiner*—Tisha D Lewis
(74) *Attorney, Agent, or Firm*—Dykema Gossett PLLC

(57) ABSTRACT

A locking differential includes a pair of clutch members that are biased together by a resilient disc and friction pack assembly toward a cross pin that extends diametrically across the central chamber of a cylindrical housing driven by the drive shaft of a vehicle, thereby to drive a pair of side gears and the output shafts splined thereto. The cross-pin extends within operating cam grooves contained in the adjacent faces of the clutch members, such that when the rotational velocity of one output shaft exceeds that of the other by a predetermined amount, the friction pack assembly of the faster shaft is operated to a non-compressed condition, thereby to disengage the over-running output shaft from the drive shaft. The resilient disc devices may be annular wave springs, or resilient disc springs.

14 Claims, 3 Drawing Sheets

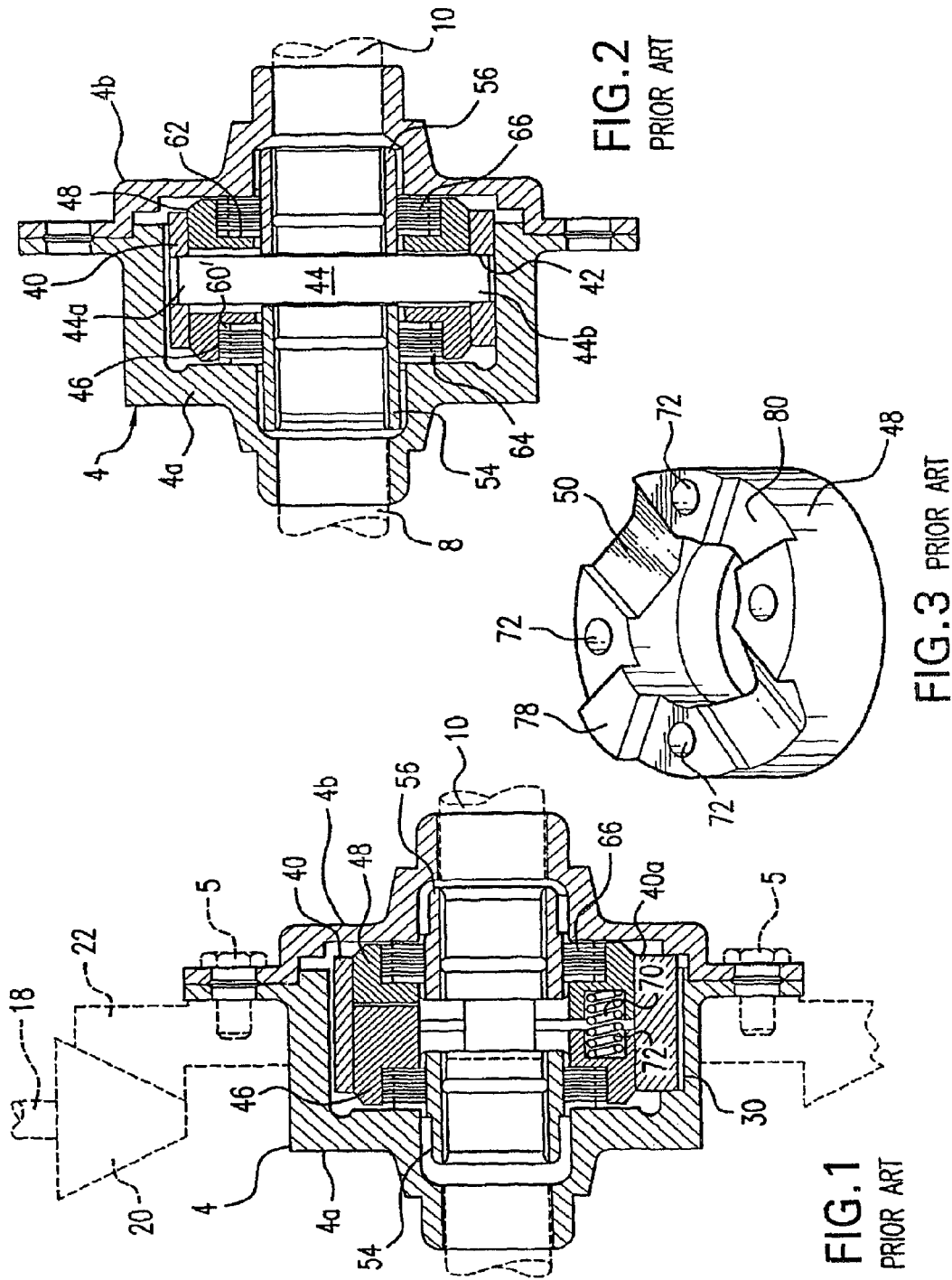

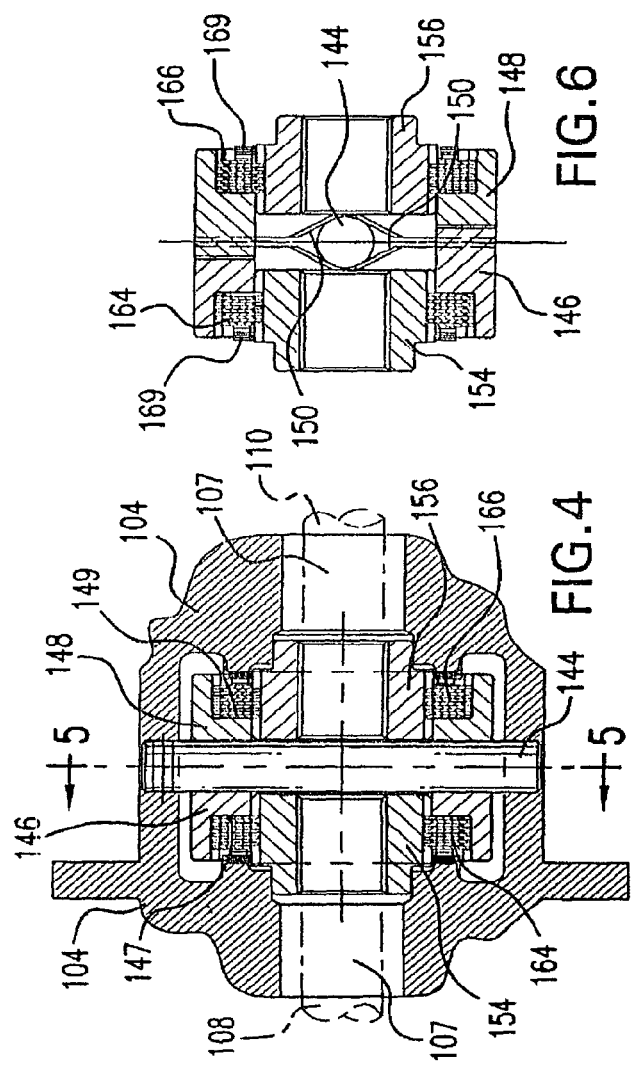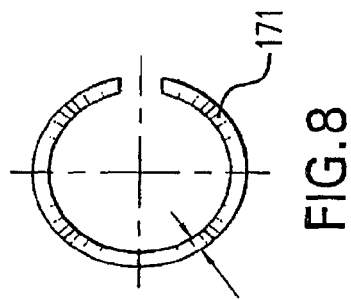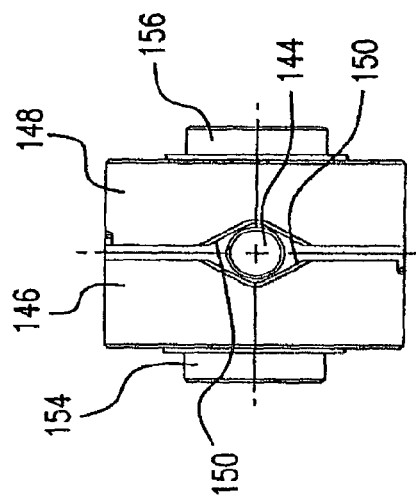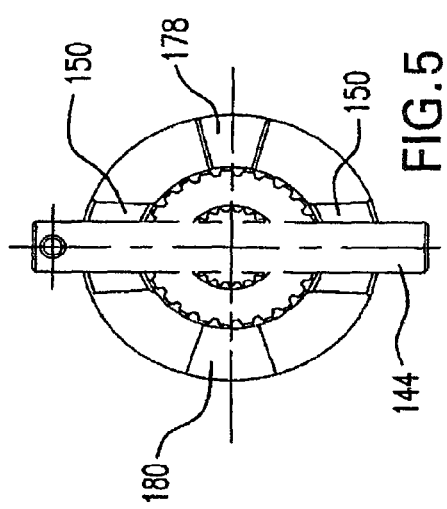

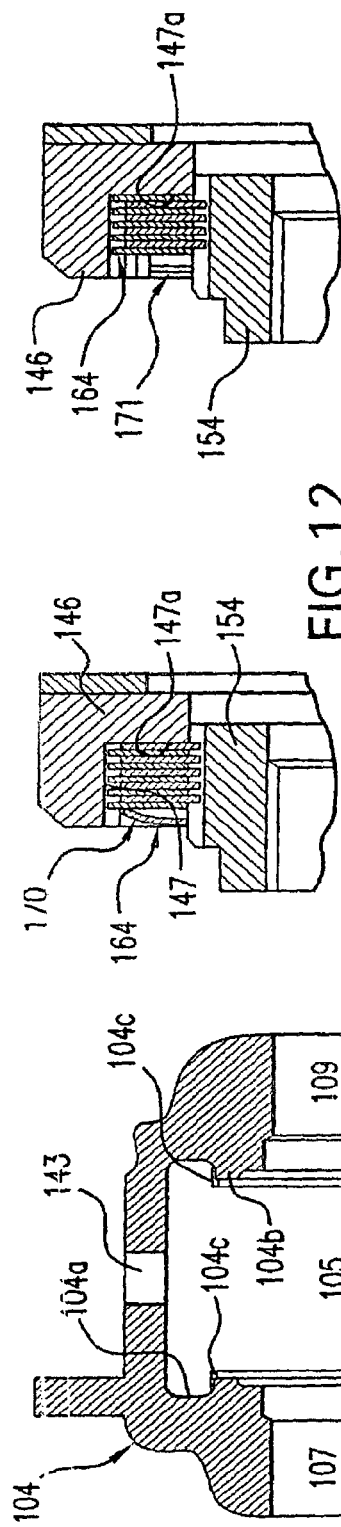

LOCKING DIFFERENTIAL INCLUDING RESILIENT DISC MEANS

CROSS REFERENCE TO RELATED APPLICATIONS

This application is a companion application to the Dissett application Ser. No. 11/189,614 filed Jul. 26, 2005 entitled "Improved Gearless Locking Differential".

BACKGROUND OF THE INVENTION

1. Field of the Invention

A locking differential includes a pair of annular collinear axially-spaced clutch members that are normally biased together by a resilient disc and friction pack assembly toward a cross pin that extends diametrically across the central chamber of a cylindrical housing driven by the drive shaft of a vehicle, thereby to drive a pair of side gears and the output shafts splined thereto. The cross-pin extends within operating cam grooves contained in the adjacent faces of the clutch members, such that when the rotational velocity of one output shaft exceeds that of the other by a predetermined amount, the friction pack assembly of the faster shaft is operated to a non-compressed condition, thereby to disengage the overrunning output shaft from the drive shaft. The resilient disc means may be annular wave springs, or resilient disc springs.

2. Description of Related Art

As evidenced by the prior U.S. patents to Schou U.S. Pat. No. 4,498,355, Zentmyer U.S. Pat. No. 5,413,015, Dissett U.S. Pat. No. 5,715,733, and Valente U.S. Pat. No. 5,836,220, among others, it is known in the patented prior art to provide locking differentials for vehicles that operate to disengage from a drive shaft a driven output shaft that overruns another output shaft by a predetermined rotational velocity. Furthermore, in the prior patents to Valente U.S. Pat. No. 5,727,430 and Dissett et al U.S. Pat. No. 6,688,194, it has been proposed to include in these locking differential arrangements axially-compressible friction pack means for connecting and disconnecting the annular clutch members of the differential with the side gears that are splined to the output shafts, respectively.

In these known prior art arrangements, in order to achieve the desired differential operation, it is conventional to use a plurality of compression springs for biasing apart the clutch members relative to a cross-pin arranged therebetween. Normally, first ends of the clutch springs are mounted in circumferentially arranged first bores contained in the face of one clutch member, with the second spring ends either extending within corresponding second bores contained in the face of the other clutch member, or into engagement with pins that extend within these second bores.

Various attempts have been made to improve differential operation by reducing backlash. Furthermore, continuing efforts have also been made to reduce the cost of the components of the differential and to simplify the assembly of the components within the central chamber of the differential housing. The present invention was developed to provide improved product operation with attendant cost reduction, and to avoid the drawbacks of the known locking differentials. The present invention is characterized by substituting for the prior compression springs that served to bias the clutch members outwardly apart, resilient disc means that are mounted concentrically about the side gears for biasing the clutch members inwardly together.

SUMMARY OF THE INVENTION

Accordingly, a primary object of the present invention is to provide a locking differential in which annular resilient disc means are mounted concentrically about the side gears, which resilient disc means react with the opposed end walls of the housing chamber to bias the clutch members together toward engagement with the cross pin, thereby to preload the clutch packs to normally compressed conditions.

According to a more specific object of the invention, the resilient disc means may be either a stack of annular wave springs, or a stack of disc springs or belleview washers. Resilient disc means are mounted in the counterbores of the two clutch members for direct engagement with the respective friction packs that connect the annular clutch members with the side gears mounted concentrically therein. The resilient disc means may be mounted at either end of the friction pack, or at an intermediate location between the ends of the friction pack assembly.

A further object of the invention is to provide a locking differential that is easier to assemble in the central chamber of the differential housing through the window contained in the housing side wall. By preloading the friction pack means with the resilient disc means of the present invention, drive-to-coast backlash is eliminated for a smoother and quieter operation. The cross pin is maintained in continuous contact with the generally V-shaped grooves contained in the adjacent faces of the clutch members. Furthermore, the resilient disc means insure that even force is applied uniformly to the friction and reaction plates of the friction pack assembly. By eliminating the compression springs of the prior art, the need for and cost of machining holes in the opposed faces of the clutch members is avoided.

BRIEF DESCRIPTION OF THE DRAWINGS

Other objects and advantages of the invention will become apparent from a study of the following specification, when viewed in the light of the accompanying drawing, in which:

FIG. 1 is a longitudinal sectional views of a locking differential of the prior art, FIG. 2 is a corresponding view taken orthogonally to that of FIG. 1, and FIG. 3 is a perspective view of one of the clutch members of the differential FIG. 1;

FIG. 4 is a sectional view of the improved locking differential of the present invention;

FIG. 5 is a transverse view taken along line 5-5 of FIG. 4 illustrating the cross-pin and clutch member arrangement;

FIG. 6 is a detailed longitudinal sectional view taken orthogonally of the differential of FIG. 4, and FIG. 7 is an elevational view of the apparatus of FIG. 6;

FIGS. 8 and 9 are plan and side views of the resilient disc means in the form of a wave spring;

FIG. 10 is a longitudinal sectional view of the housing of FIG. 4;

FIG. 11 is a sectional view of a stack of disc washers that is suitable for use as the resilient disc means of the differential of FIG. 4;

FIGS. 12-14 illustrate various locations of the disc springs of FIG. 11 relative to the friction pack assembly; and FIGS. 15-17 illustrate various positions of the wave springs of FIG. 8 relative to the friction pack assembly.

DETAILED DESCRIPTION OF THE INVENTION

Referring first to FIGS. 1-3, which illustrate the differential of the Dissett et al U.S. Pat. No. 6,688,194, it is known in the prior art to provide a locking differential having a housing 4 that is rotatably driven by a drive shaft 18 to drive a pair of aligned output shafts 8 and 10 via annular sleeve 40, a cross pin 44 contained within a pair of diametrically arranged grooves 50 (FIG. 3) contained in the opposed faces of a pair of clutch members 46 and 48, annular friction packs 64 and 68, and side gears 54 and 56. Compression springs 70 mounted in opposed bores 72 contained in the adjacent faces of the clutch members normally bias the clutch members apart to maintain the friction packs in a normally-compressed condition, whereby the clutch members 46 and 48 are normally connected with the side gears 54 and 56, respectively. Slight relative angular displacement between the clutch members is afforded by the lugs 78 (FIG. 3) that extend within corresponding oversized recesses 80 contained in the adjacent faces of the clutch members.

In this prior locking differential, when the rotational velocity of one output shaft exceeds that of the other output shaft by a predetermined amount (as might occur during a turn, for example), the clutch members 46 and 48 are relatively slightly angularly displaced and the cross-pin 44 rides up the ramp walls of the grooves 50, whereupon the friction pack associated with the overrunning output shaft is no longer compressed, and the overrunning output shaft is in a freewheeling condition. When the turn has been completed and the rotational velocities of the output shafts are equalized, the cross-pin 44 bears against the drive side of the grooves 50, and both friction packs are returned to their normally compressed condition to drive the output shafts 8 and 10.

Referring now to the present invention illustrated in FIGS. 4-7, the compression springs of the prior art differentials are replaced by resilient annular disc means 169 that are mounted concentrically about the side gears for direct cooperation with the friction pack assemblies 164 and 166, respectively. More particularly, in this improved differential, the cylindrical housing 104 contains a central chamber 105 (FIG. 10) and is arranged for rotation about its longitudinal axis L. The housing includes a pair of end wall portions 104a that contain a pair of opposed openings 107 and 109 in which are rotatably mounted a pair of side gears 154 and 156 that are splined to the output shafts 108 and 110, respectively. The housing also contains a pair of orthogonally arranged openings 143 in which are mounted the ends of the cross pin 144 that extends diagonally across the housing chamber. The cross pin extends within opposed grooves 150 contained in the adjacent faces of the annular clutch members 146 and 148 that are arranged concentrically about the side gears. Slight controlled relative angular displacement between the clutch members is afforded by the cooperation between the lugs 178 and oversized slots 180 provided in the adjacent end faces of the clutch members.

The remote ends of the clutch members 146 and 148 contain counterbores 147 that receive the annular friction packs 164 and 166, respectively. As is known in the art, the friction packs include alternate friction plates and reaction plates that are splined at their inner and outer circumferences for axial sliding movement relative to the side gears and the clutch members, respectively. In accordance with a characterizing feature of the present invention, the friction packs are normally maintained in a compressed condition by annular resilient disc means 169 that are arranged in the counterbores 147 concentrically about the side gears. These resilient disc means react with the opposed end wall portions 104a of the housing 104 to bias the clutch members together toward the cross-pin 144. As shown in FIG. 10, the housing end walls 104a are provided with annular projections 104b that are arranged to maintain the position of the resilient disc and friction pack means, as will be described below.

In accordance with the present invention, the annular resilient disc means 169 may comprise an arrangement of one or more wave washers 171 (FIGS. 8 and 9), or an arrangement of a plurality of disc springs or belleview washers 170, as shown in FIG. 11. The disc springs 170 may be selectively positioned at the free end of the friction pack (FIG. 12), within the friction and reaction plates (FIG. 13), or adjacent the counterbore bottom wall 147a, as shown in FIG. 14. Similarly, when the resilient disc means comprise annular wave springs, they may be arranged in a corresponding manner, as shown in FIGS. 15, 16 and 17. In order to retain the resilient disc means in place, an annular bead 104c may be welded to the circumferential edge portion of the face of each annular projecting portion.

In operation, when the housing 104 is rotated in a given direction by the drive shaft (not shown) connected thereto, the output shafts 108 and 110 are driven at the same rotational velocity via the cross pin 144, the grooves 150, the clutch members 146 and 148, the compressed friction packs 164 and 166, and the side gears 146 and 148, respectively. When one output shaft overruns the other by a predetermined amount, the clutch members are slightly relatively angularly displaced to cause the cross-pin 144 to be displaced up the corresponding ramp walls of the grooves 150, thereby to displace apart the clutch members against the biasing forces developed by the resilient disc means 169. The friction pack associated with the overrunning shaft is operated to its non-compressed condition, whereupon the side gear and the overrunning shaft are disconnected from the differential and are placed in a freewheeling condition. When the overrunning condition is terminated, the clutch members 146 and 148 are again biased toward each other to effect compression of both friction packs 1164 and 166, whereupon the output shafts are again driven at the same rotational velocity.

In accordance with an another feature of the invention, it has been found that a more-positive operation of the locking differential is achieved when the friction plates and the reaction plates of the friction pack means are formed of SAE 1074-1075 spring steel with a hardness of from Rc 44 to Rc 47.

It has also been found desirable to provide on the face of each annular projection 104b having a welded annular boss 104c having a thickness of about 0.072 inches. The assembly of the components in the chamber 105 through the window opening 111 contained in the side wall of the housing 104 is simpler that that of the prior art locking differentials, owing to the replacement of the previously used compression springs with the annular resilient disc means of the present invention.

It is apparent that the housing 104 could be formed as a tubular sleeve designed to be retrofit into another differential housing.

While in accordance with the provisions of the Patent Statutes the preferred forms and embodiments of the invention have been illustrated and described, it will be apparent to those skilled in the art that changes may be made without deviating from the invention described above.

What is claimed is:

1. A locking differential for an automotive vehicle having a drive shaft and a pair of colinearly arranged output shafts, comprising:
   (a) a generally-cylindrical housing adapted to be driven by the drive shaft about a longitudinal axis of rotation, said housing containing a central chamber and including a pair of opposed first end wall portions containing a pair of first openings aligned with said longitudinal axis and in communication with said chamber;
   (b) a cross pin extending diametrically across said chamber normal to said longitudinal axis, said cross pin having a pair of end portions mounted in a pair of aligned second openings contained in a pair of opposed second wall portions of said housing, respectively;
   (c) a pair of tubular side gears rotatably mounted in said first openings on opposite sides of said cross pin, respectively said side gears being internally splined for non-rotatably connection with the adjacent ends of the output shafts, respectively;
   (d) a pair of coaxially-arranged axially-spaced annular clutch members arranged concentrically about said side gears on opposite sides of said cross-pin, respectively, the remote ends of said clutch members containing counterbores, respectively, and the adjacent faces of said clutch members containing opposed diametrically extending cam grooves receiving said cross-pin, said clutch members including locking means connecting said clutch members for limited relative angular displacement;
   (e) a pair of annular friction pack means arranged within said counterbores concentrically about said side gears, respectively, each of said friction pack means including a plurality of annular alternate friction and reaction plates, said friction plates being internally splined for non-rotatable axial displacement relative to external splines on the associated side gear, said reaction plates being externally splined for non-rotatable axial displacement relative to internal splines contained on the counterbore surface of the associated clutch member, each of said friction pack means being operable between a non-compressed condition in which said friction and reaction plates are freely rotatable relative to each other, and an axially compressed condition in which said friction and reaction plates are in face-to-face non-rotatable contact, thereby to connect the clutch member for rotation with the associated side gear, wherein each of said friction pack means is normally compressed between the bottom wall of the clutch member counterbore and a corresponding annular projection on the adjacent surface of the associated housing first end wall concentrically about the first wall opening contained therein;
   (f) an annular bead arranged on the end face of each of said annular projections opposite the associated friction pack means;
   (g) spring means normally biasing said friction pack means toward their compressed condition, said spring means including resilient annular disc means mounted within said counterbores concentrically about said side gears; and
   (h) said clutch member cam grooves having such a configuration that when one of the output shafts overruns the other by a given amount, the associated overrunning side gear and clutch member are angularly displaced relative to said cross-pin, thereby to cause the associated overrunning friction pack means to be operated from its normally compressed condition to its non-compressed condition, whereby the overrunning shaft is placed in a free-wheeling disconnected condition.

2. A locking differential as defined in claim 1, wherein said resilient disc means includes at least one disc spring.

3. A locking differential as defined in claim 1, wherein said resilient disc means includes at least one annular wave spring.

4. A locking differential as defined in claim 1, wherein said annular bead comprises a circular welded boss having a diameter of about 2.028 inches and a thickness of about 0.072 inches.

5. A locking differential for an automotive vehicle having a drive shaft and a pair of colinearly arranged output shafts, comprising:
   (a) a generally-cylindrical housing adapted to be driven by the drive shaft about a longitudinal axis of rotation, said housing containing a central chamber and including a pair of opposed first end wall portions containing a pair of first openings aligned with said longitudinal axis and in communication with said chamber;
   (b) a cross pin extending diametrically across said chamber normal to said longitudinal axis, said cross pin having pair of end portions mounted in a pair of aligned second openings contained in a pair of opposed second wall portions of said housing, respectively;
   (c) a pair of tubular side gears rotatably mounted in said first openings on opposite sides of said cross pin, respectively, said side gears being internally splined for non-rotatably connection with the adjacent ends of the output shafts, respectively;
   (d) a pair of coaxially-arranged a axially-spaced annular clutch members arranged concentrically about said side gears on opposite sides of said cross-pin, respectively, the remote ends of said clutch members containing counterbores, respectively, and the adjacent faces of said clutch members containing opposed diametrically extending cam grooves receiving said cross-pin, said clutch members including locking means connecting said clutch members for limited relative angular displacement;
   (e) a pair of annular friction pack means arranged within said counterbores concentrically about said side gears, respectively, each of said friction pack means including a plurality of annular alternate friction and reaction plates, said friction plates being internally splined for non-rotatable axial displacement relative to external splines on the associated side gear, said reaction plates being externally splined for non-rotatable axial displacement relative to internal splines contained on the counterbore surface of the associated clutch member each of said friction pack means being operable between a non-compressed condition in which said friction and reaction plates are freely rotatable relative to each other, and an axially compressed condition in which said friction and reaction plates are in face-to-face non-rotatable contact, thereby to connect the clutch member for rotation with the associated side gear, wherein each of said friction pack means is normally compressed between the bottom wall of the clutch member counterbore and a corresponding annular projection on the adjacent surface of the associated housing first end wall concentrically about the first wall opening contained therein;
   (f) spring means normally biasing said friction pack means toward their compressed condition, said spring means including resilient annular disc means mounted within said counterbores concentrically about said side gears;
   (g) said clutch member cam grooves having such a configuration that when one of the output shafts overruns the other by a given amount, the associated overrunning side gear and clutch member are angularly displaced relative to said cross-pin, thereby to cause the associated overrunning friction pack means to be operated from its normally compressed condition to its non-compressed condition, whereby the overrunning shaft is placed in a free-wheeling disconnected condition, and (h) wherein said friction and reaction plates have a coefficient of surface finish of from about Ra 25 to about Ra 55.

6. A locking differential as defined in claim 5, wherein said friction and reaction plates are formed from high-carbon low alloy steel having a coefficient of hardness from about Rc 38 to about Rc 44.

7. A locking differential as defined in claim 3, wherein said annular wave spring has a spring rate of about 723 pounds per inch, and a load of about 34 pounds at 0.93 inches.

8. A locking differential for an automotive vehicle having a drive shaft and a pair of output shafts, comprising:

a housing configured to be driven by the drive shaft, said housing including a chamber and including a first end wall portion having an annular projection and having a first opening in communication with the chamber;

a side gear extending at least in part through the first opening;

an annular clutch member provided concentrically about the side gear, an end of the clutch member having a counterbore;

an annular friction pack disposed in the counterbore concentrically about the side gear, wherein the friction pack is configured to be compressed between the counterbore of the clutch member and the annular projection of the first end wall portion;

an annular bead provided on the annular projection opposite the friction pack; and a resilient annular disc disposed in the counterbore concentrically about the side gear.

9. The locking differential of claim 8, wherein the resilient annular disc includes at least one disc spring.

10. The locking differential of claim 8, wherein the resilient annular disc includes at least one annular wave spring.

11. The locking differential of claim 8, further including a cross pin extending across the chamber, the cross pin having a pair of end portions mounted in a pair of aligned second openings contained in a pair of opposed second wall portions of the housing.

12. The locking differential of claim 8, wherein the side gear is internally splined for non-rotatable connection with at least one of the output shafts.

13. The locking differential of claim 11, wherein the clutch member contains a cam groove configured to receive the cross-pin and the clutch member further includes a locking means configured to connect the clutch member for limited relative angular displacement.

14. The locking differential of claim 8, wherein the annular bead is configured to retain the resilient annular disc in place.

* * * * *